United States Patent
Kalathil et al.

(10) Patent No.: US 10,049,587 B2
(45) Date of Patent: Aug. 14, 2018

(54) UNMANNED AERIAL VEHICLE NAVIGATION

(71) Applicant: Intel IP Corporation, Santa Clara, CA (US)

(72) Inventors: Rakesh Kalathil, San Diego, CA (US); Vishnusudhan Raghupathy, San Diego, CA (US)

(73) Assignee: Intel IP Corporation, Santa Clara, CA (US)

( * ) Notice: Subject to any disclaimer, the term of this patent is extended or adjusted under 35 U.S.C. 154(b) by 98 days.

(21) Appl. No.: 15/200,154

(22) Filed: Jul. 1, 2016

(65) Prior Publication Data

US 2018/0005535 A1    Jan. 4, 2018

(51) Int. Cl.
| | | |
|---|---|---|
| *G01C 21/00* | (2006.01) | |
| *G08G 5/00* | (2006.01) | |
| *H04B 1/3822* | (2015.01) | |
| *H04W 4/021* | (2018.01) | |
| *H04W 72/04* | (2009.01) | |
| *B64C 39/02* | (2006.01) | |

(52) U.S. Cl.
CPC ......... *G08G 5/0069* (2013.01); *B64C 39/024* (2013.01); *G08G 5/0013* (2013.01); *H04B 1/3822* (2013.01); *H04W 4/021* (2013.01); *H04W 72/046* (2013.01); *H04W 72/0466* (2013.01); *B64C 2201/146* (2013.01)

(58) Field of Classification Search
CPC .. B64C 39/024; G08G 5/0013; H04B 1/3822; H04W 4/021; H04W 72/046; H04W 72/0466

USPC .................................. 701/516, 216, 200
See application file for complete search history.

(56) References Cited

U.S. PATENT DOCUMENTS

| | | |
|---|---|---|
| 2014/0286235 A1 | 9/2014 | Chang |
| 2015/0226834 A1 | 8/2015 | Floch |
| 2016/0112116 A1 | 4/2016 | Jalali et al. |
| 2016/0134358 A1 | 5/2016 | Jalali et al. |

FOREIGN PATENT DOCUMENTS

JP    2003134571    5/2003

OTHER PUBLICATIONS

"International Application Serial No. PCT/US2017/029101, Written Opinion dated Jul. 18, 2017", 8 pgs.
"International Application Serial No. PCT/US2017/029101, International Search Report dated Jul. 18, 2017", 3 pgs.

*Primary Examiner* — Maceeh Anwari
(74) *Attorney, Agent, or Firm* — Schwegman Lundberg & Woessner, P.A.

(57) ABSTRACT

System and techniques for unmanned aerial vehicle navigation are described herein. A plurality of transmission beams may be established. Here, each beam in the plurality of transmission beams is a focused photonic propagation directed to a fixed geographic area and a travel route intersects the fixed geographic areas of the plurality of transmission beams. Cell entry may be received for a vehicle transceiver entering a geographic area for a transmission beam in the plurality of beams. Scrambling codes corresponding to the plurality of transmission beams may be provided to the vehicle. A course parameter, decodable by a scrambling code of the scrambling codes, may be transmitted to the vehicle via the plurality of transmission beams.

24 Claims, 8 Drawing Sheets

| FIELD | 3GPP RELEASE | 1.4 MHZ | 3 MHZ | 5 MHZ | 10 MHZ | 15 MHZ | 20 MHZ |
|---|---|---|---|---|---|---|---|
| RESOURCE ALLOCATION HEADER | 9 | 0 BITS | | | 1 BIT | | |
| RESOURCE BLOCK ALLOCATION | 9 | 6 BITS | 8 BITS | 13 BITS | 17 BITS | 19 BITS | 25 BITS |
| TPC COMMAND FOR PUCCH | 9 | 2 BITS | | | | | |
| DOWNLINK ASSIGNMENT INDEX | 9 | 2 BITS (TDD ONLY) | | | | | |
| HARQ PROCESS NUMBER | 9 | 3 BITS (FDD)/ 4 BITS (TDD) | | | | | |
| SCRAMBLING IDENTITY | 9 | 4 BITS | | | | | |
| SRS REQUEST | 10 | 0 OR 1 BIT (TDD ONLY) | | | | | |
| TRANSPORT BLOCK | | | | | | | |
| MODULATION AND CODING SCHEME | 9 | 5 BITS | | | | | |
| REDUNDANCY VERSION | 9 | 1 BIT | | | | | |
| NEW DATA INDICATORY | 9 | 2 BITS | | | | | |

*FIG. 5*

| PHYSICAL LAYER CELL IDENTITY | | | |
|---|---|---|---|
| CELL GLOBAL IDENTITY | | | |
| EARFCN | | | |
| ANTENNA PORT CONFIGURATION | | | |
| CYCLIC PREFIX LENGTH | | | |
| NAVIGATION REFERENCE SIGNAL (NRS) INFORMATION | NRS BAND WIDTH | | |
| | NRS CONFIGURATION INDEX | | |
| | NUMBER OF CONSECUTIVE DOWNLINK SUBFRAMES | | |
| | NRS MUTING INFORMATION | CHOICE | BIT STRING LENGTH 2 BITS |
| | | | BIT STRING LENGTH 4 BITS |
| | | | BIT STRING LENGTH 8 BITS |
| | | | BIT STRING LENGTH 16 BITS |

UNMANNED AERIAL VEHICLE NAVIGATION

TECHNICAL FIELD

Embodiments described herein generally relate to vehicle navigation systems and more specifically to unmanned aerial vehicle navigation.

BACKGROUND

Unlike navigation using roads, vehicle navigation across media that does not include intrinsic paths generally involves creating a traversal plan. Examples may include flight plans, marine navigation plan, or a route across a grassy plain. Autonomous vehicles, such as unmanned aerial drones, are improving so as to fill a greater number of industrial or recreational purposes previously filled by manned vehicles. Without an active pilot, these vehicles may rely more heavily on traversal plans to arrive at a destination.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 5 illustrates an example of a downlink control information (DCI) format for decoding NRS, according to an embodiment.

FIG. 6 illustrates an example of a location positioning protocol (LPP) message containing NRS information, according to an embodiment.

DETAILED DESCRIPTION

Figure 1:
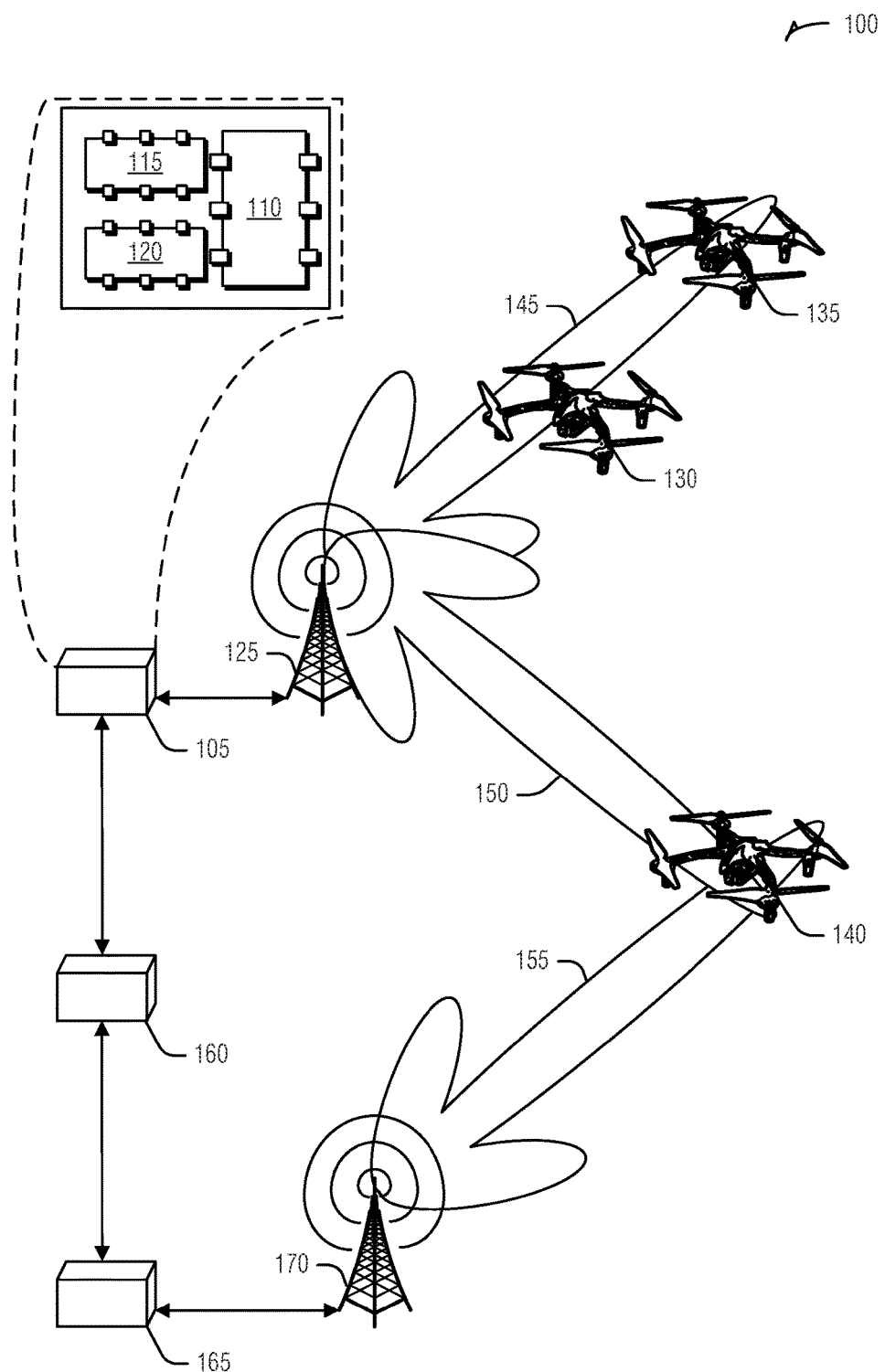
FIG. 1 illustrates an environment including a system for unmanned aerial navigation, according to an embodiment.

Unmanned (e.g., autonomous, without a pilot, etc.) vehicles, such as Unmanned Aerial Vehicles (UAV) (e.g., drones), car, or boats, are either controlled using direct wireless communication or via onboard navigation systems with maps, positioning, etc. Generally, the Global Positioning System (GPS) or similar satellite or ground-based positioning system is used to locate the drone on its maps. However, drone navigation remains a very manual and resource intensive process. for example, providing the flight plans or human pilots for long distance autonomous flight navigation of many drones is very much an open issue. That is, automating navigation for long distance autonomous flights is a problem that needs to be solved for next generation drones and their applications.

To address the issue, current cellular infrastructure and capabilities may be leveraged to create a virtual interstate highway system that covers large distances across unmarked media such as the air, water, or open land. For simplicity, the example of navigating the skies is used herein, but the systems and techniques described may also be used for traversing other media. To implement this virtual highway, cellular (cell), or other wireless techniques, provide geographically distinct transmissions of navigation parameters, such as direction, velocity, altitude, etc. To isolate the wireless transmissions to specific areas, and thus impart a structure like a road in that area, beamforming techniques are used. For example, with Full Dimension MIMO (FD-MIMO (3D)) in Long Term Evolution (LTE) cell standards, beams are targeted to a horizontal (e.g., Azimuth Angle) and vertical (e.g., Elevation Angle) location from the antenna array. Information passed to devices is controlled by the horizontal and vertical elevation of beams. That is, if the device is not in the beam, the device does not receive the information. In order to further isolate these beamed signals, a scrambling code specific to each beam is used by the user equipment (UE) and base station (e.g., eNodeB). Currently, LTE provides a scrambling identity (SCID) in DCI format 2B/2C to enable data decoding for a particular beam. Thus, a first UE may be assigned a first SCID for decoding a first beam and second UE may be assigned a second SCID for decoding a second beam. This arrangement allows the same resource blocks (e.g., defined by time and frequency) to be used to communicate different information to the first UE and the second UE.

The isolated nature of the beamed signals permits a technique whereby beam locations intersecting the route communicate with drones traveling the route, and thus may provide navigation information to the drones. To facilitate this information passing, scrambling codes for a cell's beams participating in the route may be given at once, together, when the drone enters the cell. Thus, as the drone traverses the participating beams the drone may receive navigation information. In an example, the beams may be static beacons, transmitting the same navigation parameters to any drone that enters the beam. In this way, a drone need simply navigate to a first beam to get on the route, the additional route legs being received as the drone enters additional participating beams until the destination is reached.

Using this technique and the destination information of a drone, an eNodeB may provide the navigation information for far away destinations in terms of beams and cells that the drone may take to reach its destination. This technique results in a robust and scalable unmanned navigation system that uses current cellular infrastructure to provide predefined routes for long distance autonomous navigation. Thus, for example, a drone may fly across the country using the cellular infrastructure without manual intervention. Further, the specific routes require little to change, resulting in a flexible yet resource thrifty long distance navigation solution. Additionally, because the same resource blocks may be used on every beam for the navigation parameters, this technique uses time and frequency resources efficiently.

FIG. 1 illustrates an environment 100 including a system 105 for unmanned aerial navigation, according to an embodiment. The system 105 may include a transceiver 110, a decoder 115, and an encoder 120. The components of the system 105 are implemented in computer hardware, such as that described below with respect to FIG. 11 (e.g., circuitry). In an example, the system 105 is an eNodeB, or other network component, operating in accordance with a 3GPP family of cell standards.

The transceiver 110 may be arranged to drive an antenna array to establish a plurality of transmission beams, such as beam 145 and beam 150 in a cell 125. Here, each beam in the plurality of transmission beams is a focused photonic propagation directed to a fixed geographic area. Generally, this is accomplished by phase variance across the antenna array to create constructive and destructive interference resulting in a beam like coverage area rather than the spherical area generally covered by omnidirectional antennas. However, other techniques may also be used to form the beams 145, 150. These plurality of beams all intersect a travel route upon which the drones 130, 135, and 140 are traveling.

The decoder 115 is arranged to receive cell entry for a vehicle transceiver (e.g., upon drone 130) entering a geographic area for a transmission beam 145 in the plurality of beams. Thus, using standard cell entry protocols, the decoder 115 brings the drone 130 into the cell 125.

The encoder 120 is arranged to provide scrambling codes corresponding to the plurality of transmission beams to the vehicle, where each beam in the plurality of transmission beams has a different scrambling code. The scrambling codes may be assigned (e.g., from a pool of available codes), derived, or achieved in any other manner. In an example, the scrambling codes conform to SCIDs in accordance with a 3GPP family of standards. Because the beams are used along the route, providing the scrambling codes for just those beams permits the drone 130 to receive route specific navigation parameters. If the drone wants to change to a different route, the drone 130 merely moves to another beam, outside the plurality of beams, to pick up the different route. In an example, the scrambling codes are provided in a radio resource control (RRC) reconfiguration. In an example, the RRC reconfiguration includes a beam geometry for beams in the plurality of transmission beams. In an example, the beam geometry includes at least one of a geographic anchor point, an elevation angle, or an azimuth.

In an example, the encoder 120 is arranged to transmit a course parameter to the vehicle via the plurality of transmission beams. In an example, the course parameter is a heading. In an example, the course parameter is a velocity. In an example, the course parameter is an altitude.

In an example, the course parameter is transmitted via a single beam 145 of the plurality of transmission beams. In an example, each beam in the plurality of transmission beams includes a corresponding fixed course parameter. Here, a fixed course parameter is the same without regard to a position of the vehicle 130. In an example, a second vehicle 135 is sent the same fixed course parameter that is transmitted to the vehicle 130. Here, the beam 145 broadcasts the course parameter to any vehicle that may decode the beam 145 transmission. Thus, every vehicle (e.g., drones 130 and 135) in the beam 145 receive the same course parameter. In this way, aspects of the highway are transmitted to whatever is traveling via the virtual highway. Combining multiple beams (e.g., beams 145, 150, and 155 in second cell 170) creates the highway (e.g., as a set of segments or waypoints), with each beam 145 being a segment of the route.

While the beam arrangements and transmission described above establish the virtual highway, the system 105 may optionally include a network navigation controller 160 to facilitate vehicle navigation. When in operation, the network navigation controller 160 is communicatively coupled to the eNodeB of system 105. The network navigation controller 160 includes a transceiver, a memory, and circuitry configured by instructions in the memory. The configured circuitry arranging the network navigation controller 160 to receive a current position for the vehicle 130 via its transceiver. The network navigation controller 160 is also arranged to receive a destination position for the vehicle 130 via its transceiver. The network navigation controller 160 is arranged to plot the route that the vehicle 130 will use to traverse from its current position to its destination and direct the vehicle 130 to the single beam 145 via its transceiver. These operations may be considered akin to direction to reach the on-ramp of the virtual highway. In an example, the vehicle direction also includes a sequence of cells (e.g., cell 125 and then cell 170) or beams (e.g., beam 145, beam 150, and beam 155) that make up segments of the route. Here, the network navigation controller 160 may also establish route control of, for example, the second cell 170 via its eNodeB 165 or other radio controller.

In an example, the decoder 115 is arranged to obtain a handover trigger based on a position of the vehicle 130. In this example, the encoder 120 may be arranged to perform a handover to a second cell 170. Here, the handover may include a set of scrambling codes for at least one transmission beam 155 of the second cell 170 participating in the route. Thus, the virtual highway may traverse several cells along the route, enabling long distance navigation. In an example, the set of scrambling codes is conveyed in a radio resource control (RRC) reconfiguration. In an example, the trigger is a measurement report from the vehicle identifying the second cell and a radio condition beyond a threshold. Generally the measurement reports indicate signal strength, cell identification, or other wireless metrics permitting insight into the vehicle 130 leaving the cell 125 and enter the cell 170.

Figure 2:
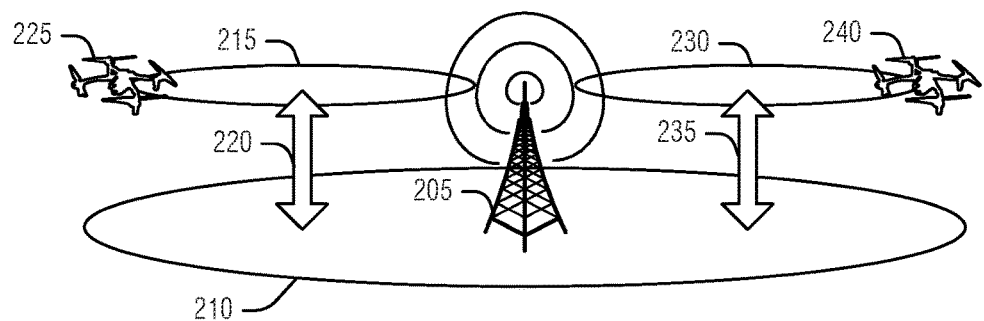
FIG. 2 illustrates an arrangement of beams and aerial vehicles, according to an embodiment.

FIG. 2 illustrates an arrangement of beams 215 and 230 and aerial vehicles 225 and 240, according to an embodiment. Here, the cell 210 includes an antenna array 205 which has established the beams 215 and 230. As noted above, the cell 210 provides azimuth and elevation beam characteristics 220 and 235 to the vehicles 225 and 240 via beams 215 and 230 respectively. This side-view illustrates the vehicle specific communication via beams 215 and 230 that enables definition of the virtual highway. Thus an eNodeB have a static set of beams elevated at certain level, such as via the antenna array 205, covering the range used for drone navigation.

Also, as noted above, to enable decoding of these beams 215 and 230 along the route, eNodeB provides the SCIDs to the vehicles 225 and 240 at one time, such as during cell entry. For example, suppose that the beams 215 and 230 are static, beam 215 decodable via SCID A and beam 230 decodable via SCID B. The eNodeB provides the vehicle 225 with the SCIDs A and B when the vehicle 225 enters the cell 210. This is in contrast to normal cell practice in which a single SCID is provided for a servicing beam to a UE. When the vehicle 225 is in a first location, covered by beam 215, it decodes the signal using SCID A because it cannot even receive beam 230 at this time. However, when the vehicle 215 moves into the beam 230, it will not need to receive further information from the cell 210 to decode the beam 230 has the vehicle 225 already has the SCID B. In this manner, as the vehicle 215 moves from one location to another, it decodes different navigation parameters from different beams 215 and 230 while only receiving the decoding information once for the entire cell 210.

Figure 3:
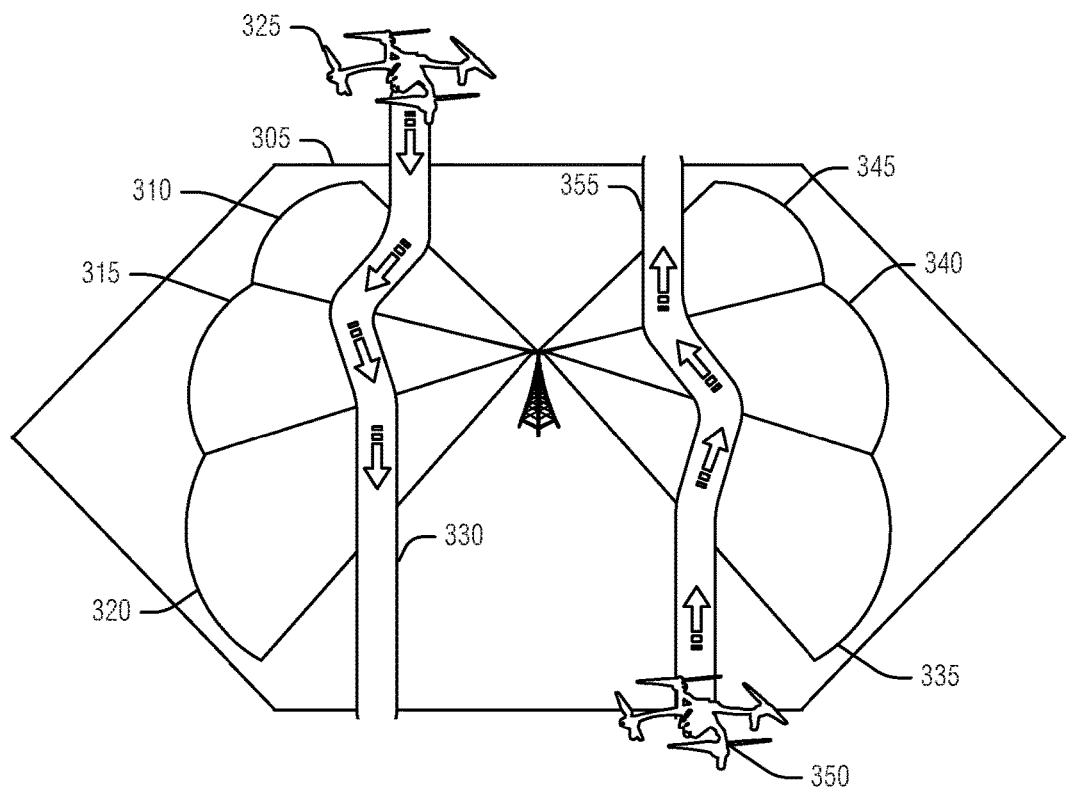
FIG. 3 illustrates an example of two routes through a cell, according to an embodiment.

FIG. 3 illustrates an example of two routes 330 and 355 through a cell 305, according to an embodiment. The beams 310, 315, and 320 may be established in a predefined geographic layout and transmit segment specific navigation parameters (illustrated by the motion arrows on the route 330) to each provide a segment of the route 330. Similarly, beams 335, 340, and 345 provide segments for the route 355. For example, beam transmits specific direction information which is valid within the area covered by the beam. The drone 325 is configured (e.g., by providing the list of SCIDs of these beams) to find and read beam information for its route 330. On decoding the information specified in the beam, the drone 325 gets a direction (e.g., heading), velocity, or other navigation information stay on the route 330 (e.g., with the region of the beam 310 while traversing that segment of the route 330). When the drone 325 enters a new beam, such as beam 315, the direction information sent on the beam 315 is received and used by the drone 325.

By using beams in this way, a single cell 305 may provide segments that are part of a plurality of routes, such as routes 330 and 355. By providing SCIDs for beams specific to a vehicle's route, the vehicle, such as drone 225, will not be put off course from route 330 even if the drone 325 receives a signal from beam 345 of route 355 because drone 325 will not have the SCID for beam 345 to decode it.

To facilitate use of current cellular infrastructure to implement the unmanned aerial vehicle navigation described throughout, an NRS may be used. In contrast to other reference signals in cellular networks, such as a sounding reference signal SRS, the NRS may be used both for radio measurements (like the SRS) and also to convey navigation information to the vehicle. The network (e.g., via the cell) may transmit navigation information to multiple vehicles in idle mode, and separate NRS, and thus information, on each beam. Once the DCIDs are given to the vehicle, using the NRS, the vehicle will be able to decode the NRS, and thus the navigation parameters, even when in idle with respect to the cell. This type of operation saves resources, both processing and energy resources, of the vehicle while still providing the navigation parameters in a timely manner.

As shown in the above example (FIG. 3), when operating under a 3GPP cellular standard, beam 310 transmits specific navigation related information (e.g., navigation parameters) to the vehicle 325 (whether or not vehicle 325's transceiver is in idle mode). The vehicle 325 was given SCIDs when in connected mode, or is made aware of this information in idle mode using system information blocks (SIBs). In idle mode, once the SCIDs are known, the vehicle 325 may listen to the NRS and try to decode it using the collection of SCIDs it has. For example, in its first leg, the vehicle 325 may decode only the NRS for beam 310 to receive navigation parameters, such as [heading: 0 degrees from south; velocity: 40 mph]. As long as vehicle 325 receive continues to be within the fixed geographic area of beam 310, the vehicle 325 will periodically receive the NRS and keep moving South. When the vehicle 325 enters the region of beam 315, it will be unable to decode beam 315's NRS using the SCID for beam 310, but is able to decode the new NRS for beam 315 using the SCID specific to beam 315. In an example, same resource blocks are used for the NRS in both beams 310 and 315, although the specific information in the NRS may vary between the regions. When decoding the NRS for beam 315, the vehicle 325 drone may get different navigation information, such as [heading: 60 degrees from south; velocity: 80 mph]. The vehicle 325 uses the navigation parameters in the NRS and changes its course, thus navigating across the cell 305 along the route 330.

In an example, the transmission point (e.g., cell 305) transmits the navigation information in the beam 310 using a NRS that is periodic in nature. This information may be decoded by vehicle 325's receiver when operating in either connected mode or idle mode. Executing the received navigation information causes the vehicle 325 to navigate according to that information until a next periodic signal is received, a new beam is found, the destination is reached, or any other condition imposed to terminate navigation or plotting of the route 330 by the user.

In an example, the same SCID may be used for one beam or for all beams participating in the route 330 across multiple cells. This may ease configuration and data transmission resources when the vehicle 325 is operating in idle mode. Idle mode permits resource (e.g., energy) efficient operation by the vehicle 325. When operating in idle mode, using NRS, the vehicle 325 does not need to be handed over between cells. In idle mode, SIB, or any other control information signaling, may be used to inform the vehicle 325 of the SCID to be used.

Figure 4:
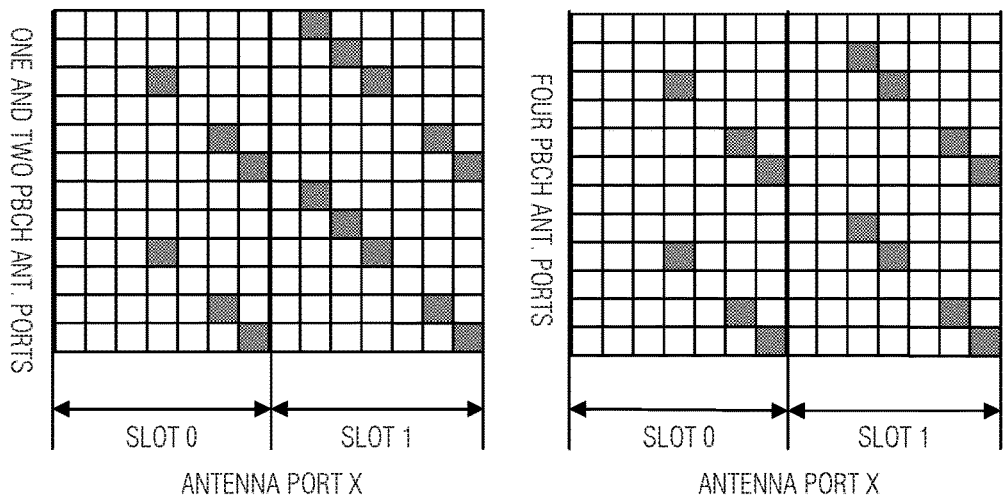
FIG. 4 illustrates an example of a predefined symbol reference pattern and periodicity for a navigation reference signal (NRS), according to an embodiment.

FIG. 4 illustrates an example of a predefined symbol reference pattern and periodicity for a navigation reference signal (NRS), according to an embodiment. Similar to a positioning reference signal, NRS may use a specified port and periodicity to be effective. An example port x and periodicity in which the NRS may be transmitted is illustrated. These examples may be modified based on specific use cases. In an example, each cell may use different predefined NRS symbol patterns which may be communicated in advance to all the drones that would use the NRS.

The shaded boxes corresponding to resource blocks (rows are frequency and columns are time) used by the NRS. Note that the first set correspond to a two port (e.g., antenna) configuration for the physical broadcast channel (PBCH) while the second set of boxes (on the right) are added to the first in a four port configuration for the eNodeB. The table below illustrates an example periodicity for the NRS. Note, for clarity, $I_{NRS}$, $T_{NRS}$, and $\Delta_{NRS}$ and represented with an underscore (_) separating the subscript and the element.

FIG. 5 illustrates an example of a downlink control information (DCI) format for decoding NRS, according to an embodiment. In 3GPP compliant vehicle transceivers, vehicles are configured in connected mode to receive SCIDs using a new DCI format. The DCI format includes space (e.g., bits) to convey specific information to be able to decode navigation parameters that is beam formed as described above. FIG. 5 illustrates an example DCI format and corresponding bit space for the various fields. Note, more bits are used for SCIDs than in the standard 3GPP implementation because more beams (e.g., those along the route) to decode are communicated at once. In the illustrated example, the SCID field is increased to 4 bits.

Vehicles in connected mode may use a specific channel state information reference signal (CSI-RS) that also provides navigation parameters. Thus, the CSI-RS, under this modification, is the NRS. Using this information, each vehicle may be separately (e.g., individually) configured controlled via specific navigational parameters. For example, each vehicle may be given different instant navigation change information, transmitted to specific vehicle by providing dedicated SCIDs in the illustrated DCI format to decode the vehicle specific information.

FIG. 6 illustrates an example of a location positioning protocol (LPP) message containing NRS information, according to an embodiment. As noted in FIG. 1, a network navigation controller may provide route information to vehicles or to eNodeB's. In a 3GPP network, this information may be provided in an LPP message, as illustrated in FIG. 6. The LPP message is sent from the core network to eNodeBs providing NRS information. This LPP message may be similar to the current positioning reference signal message. The LPP may be transmitted over the SLm interface. The network navigation controller may be located in the core network, in a gateway, or in a mobility management entity (MME). The network navigation controller may use the S1 interface to send NRS Information to eNodeBs.

Figure 7:
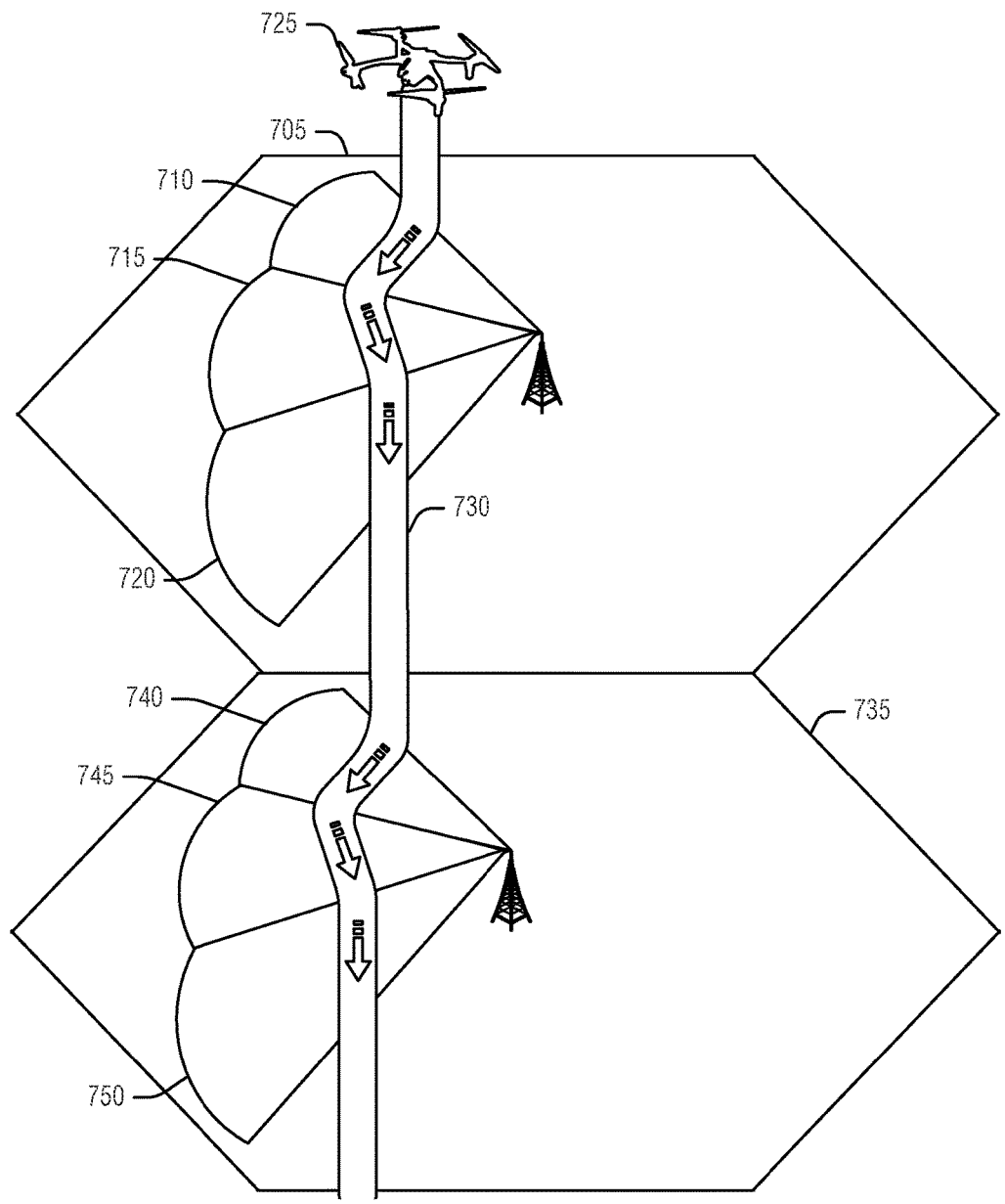
FIG. 7 illustrates an example of a route passing through two cells, according to an embodiment.

FIG. 7 illustrates an example of a route 730 passing through two cells 705 and 735, according to an embodiment. The operation here is similar to that described with respect to FIG. 3, however, the route 730 traverses multiple cells. Thus, cell 705 will perform a handover of vehicle 725 to cell 735. This handover may occur on a trigger, such as a radio measurement when the vehicle 725 is in beam 720 and a received signal strength of cell 735, or beam 740 exceeds a threshold. In an example, the trigger may be a travel duration within beam 720, thus indicating that the vehicle 725 is, or will, arrive at beam 740 due to the static geographic configuration of the beams 710, 715, 740, 745, and 750.

Figure 8:
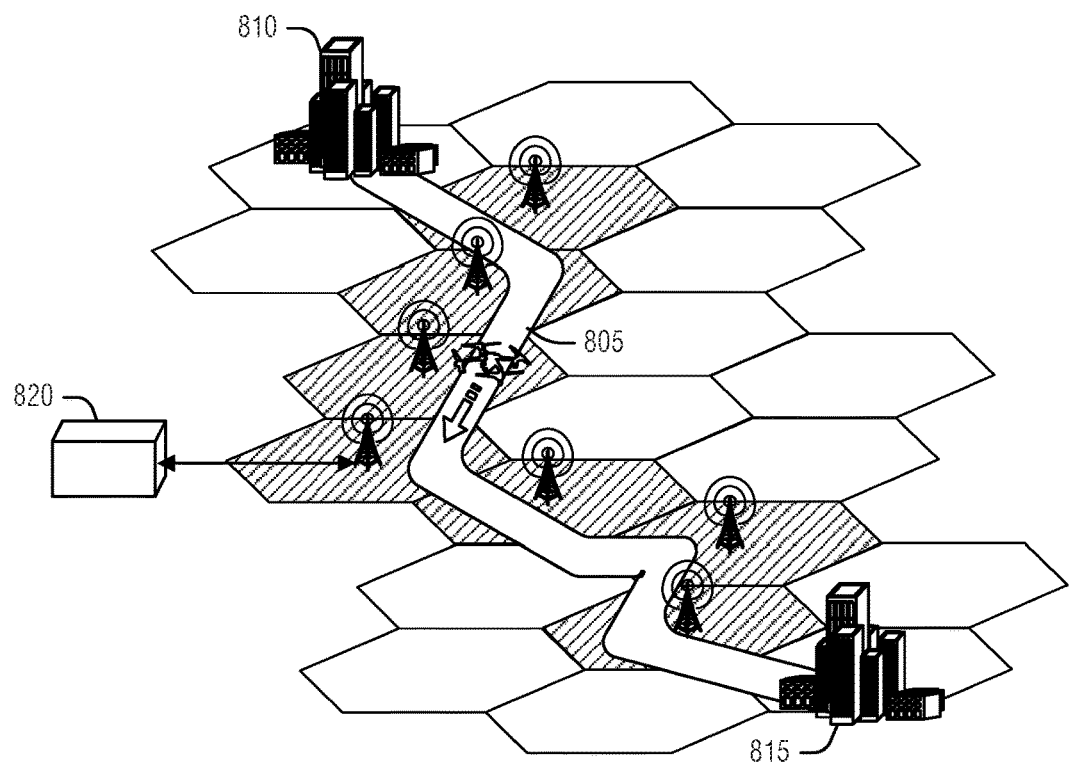
FIG. 8 illustrates an example of a route between two destinations passing through several cells, according to an embodiment.

FIG. 8 illustrates an example of a route 805 between two points (e.g., cities 810 and 815) passing through several cells, according to an embodiment. The shaded cells participate in providing beams, and thus segments to the route 805. The network navigation controller 820 is communicatively coupled to the shaded cells, providing beam parameters, such as azimuth, elevation, and navigation parameters to define segments for the route 805. Thus, a drone operator in city 810 may contact the network navigation controller 820 with a destination of city 815. The network navigation controller 820 provides a sequence of the shaded cells, beams within these cells, or simply a first beam in the first cell corresponding to the route 805. In an example, route are unidirectional. In an example, routes are bidirectional. The drone then heads for the initial beam, "gets on" the route, and is carried via the beam-segment navigation parameters all the way to city 815 without the cumbersome flight planning or human supervision currently used.

In an example, using the NRS described above, the arrangement illustrated in FIG. 8 may be used as an NRS network. Each beam in each cell would act as a point in which, for example, a set of GPS coordinates or elevation associated corresponding to each point along the route 805 (e.g., decided by the network navigation controller) is provided to vehicles that enter a cell. Vehicles may use this information, encoded in NRS. to align its navigation autonomously along the specified path 805 and across a given cell.

Figure 9:
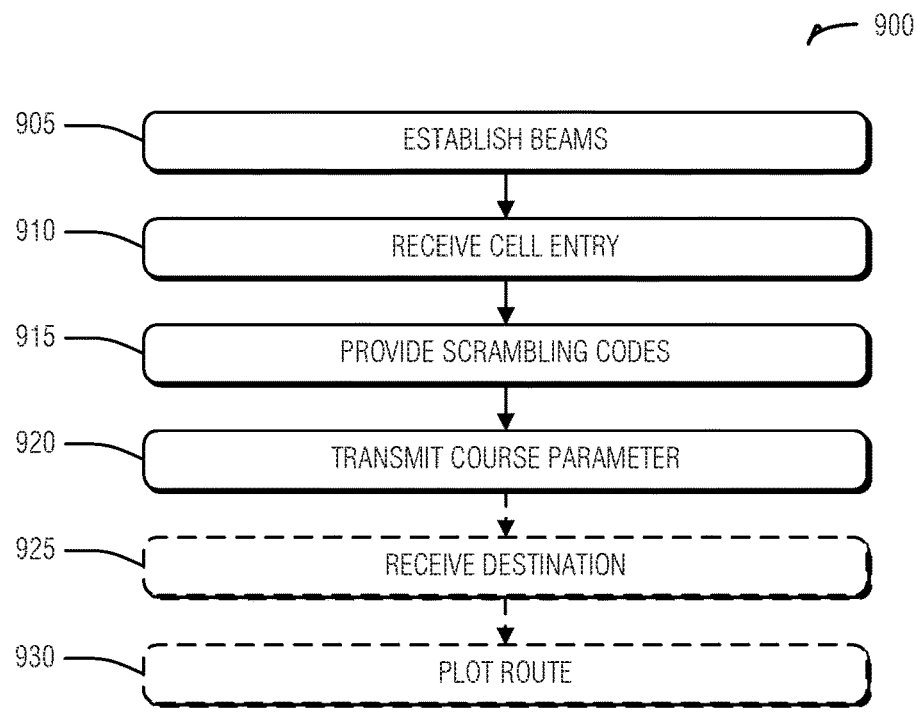
FIG. 9 illustrates an example of a method to for unmanned aerial vehicle navigation, according to an embodiment.

FIG. 9 illustrates an example of a method 900 to for unmanned aerial vehicle navigation, according to an embodiment. Operations of the method 900 are implemented in computer hardware, such as that described above, or below with respect to FIG. 11 (e.g., circuitry).

At operation 905, a plurality of transmission beams are established. Here, each beam in the plurality of transmission beams is a focused photonic propagation directed to a fixed geographic area. The plurality of transmission beams share a common trait of intersecting (e.g., overlapping) a travel route intersecting via their fixed geographic areas.

At operation 910, cell entry for a vehicle transceiver entering a geographic area for a transmission beam in the plurality of beams is received.

At operation 915, scrambling codes corresponding to the plurality of transmission beams are provided to the vehicle. Here, each beam in the plurality of transmission beams has a different scrambling code. In an example, the scrambling codes are provided in a RRC reconfiguration. In an example, the RRC reconfiguration includes a beam geometry for beams in the plurality of transmission beams. In an example, the beam geometry includes at least one of a geographic anchor point, an elevation angle, or an azimuth.

At operation 920, a course parameter is transmitted to the vehicle via the plurality of transmission beams. In an example, the course parameter is at least one of a heading, a velocity, or an altitude. In an example, the course parameter is transmitted via a single beam of the plurality of transmission beams. In an example, each beam in the plurality of transmission beams includes a corresponding fixed course parameter. Here, a fixed course parameter is the same without regard to a position of the vehicle (e.g., a heading remains the same regardless of the vehicles position in the fixed geographic area of the beam). In an example, a second vehicle is sent the same fixed course parameter that is transmitted to the vehicle (e.g., every vehicle gets the same navigation parameters).

The method 900 may be extended to include operations 925 and 930. At operation 920, a current position and a destination position for the vehicle are received. In an example, the current position and the destination position may be received in separate messages.

At operation 930, the route is plotted using the current position and the destination position. Similar to roadway navigation, the route is plotted by establishing segments of the route via the established plurality of beams. After the route is plotted, the method 900 may the vehicle to the single beam (e.g., the on-ramp of the virtual highway).

The method 900 may be extended to include obtaining a handover trigger based on a position of the vehicle. In an example, wherein the trigger is a measurement report from the vehicle identifying the second cell and a radio condition beyond a threshold.

The method 900 may be extended to include performing a handover to a second cell. Here the handover include a set of scrambling codes for at least one transmission beam of the second cell participating in the route. Thus, the vehicle is given the SCIDs for beams in the route of the next cell. In an example, the set of scrambling codes is conveyed in a RRC reconfiguration.

Figure 10:
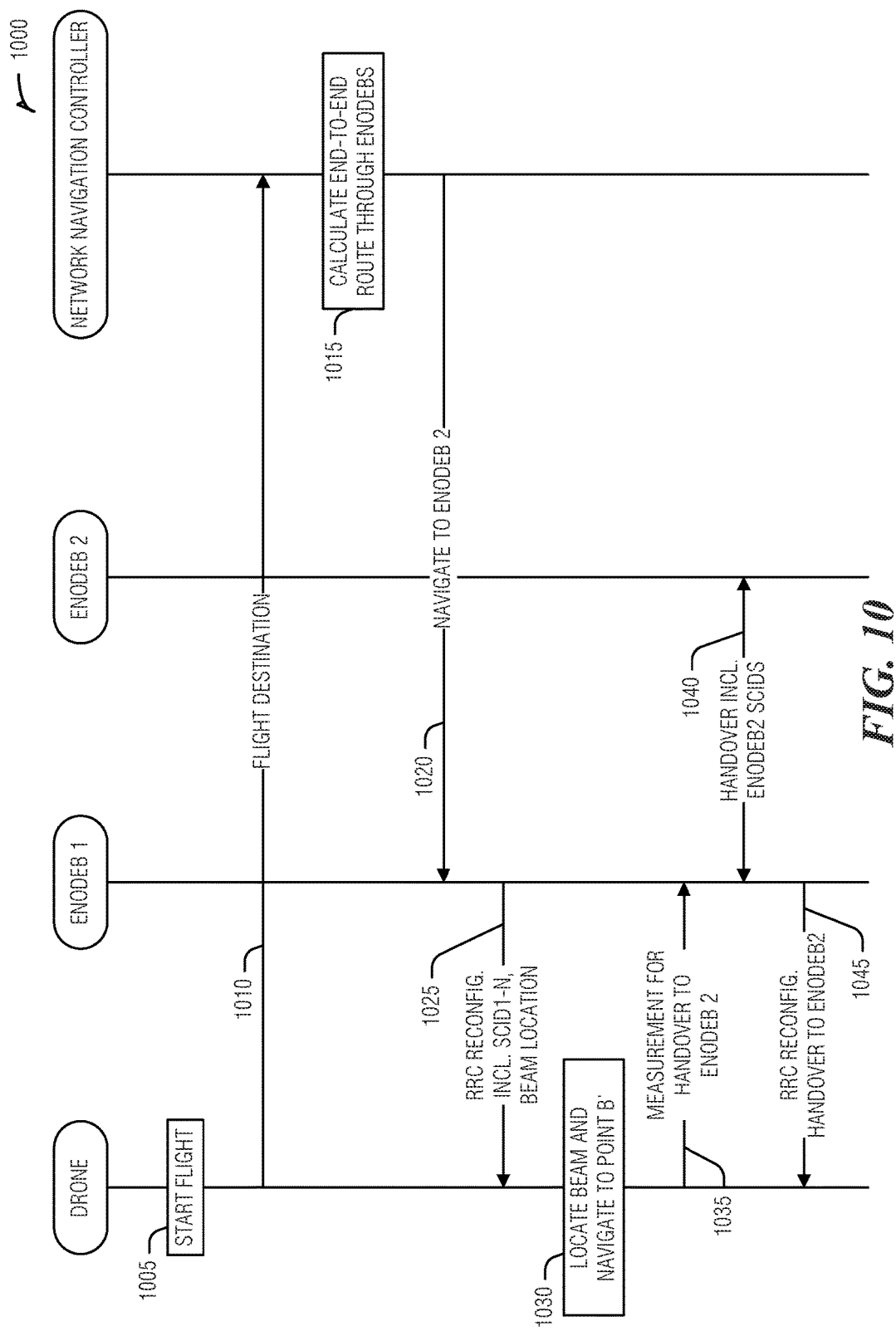
FIG. 10 is a swim lane diagram of a method for unmanned aerial vehicle navigation, according to an embodiment.

FIG. 10 is a swim lane diagram of a method 1000 for unmanned aerial vehicle navigation, according to an embodiment.

When a drone starts its flight (operation 1005) it contacts the network and updates its destination (message 1010) to network navigation controller.

The network navigation controller calculates the path through the cells for the route (operation 1015) and sends the information to eNodeB 1 (message 1020) that is currently serving the drone. ENodeB 1 calculates the beams for the route through which the drone will navigate.

In RRC Connection Reconfiguration, eNodeB 1 gives the drone the location of the beam (e.g., in terms of elevation) and a set of SCIDs for the relevant beams (message 1025).

The drone then searches for at least one of the specified beams and when at least one is decodable, gets the bearing (e.g., degrees from north), velocity, or other navigation parameters for this segment of the route (operation 1030).

When a new beam is encountered, such as when the drone leaves the area of the first beam and enters that of the second beam, the drone receives a new heading, velocity, or other navigation parameter to stay on the route.

When the drone enters, or is about to enter (message 1035), a new cell, the eNodeB 2 provides SCIDs for its beams defining segments for the route to the eNodeB 1 (message 1040). ENodeB 1 provides these eNodeB 2 SCIDs to the drone using RRC (message 1045).

Using the systems and techniques described above provides a powerful, simple, and efficient mechanism to provide unmanned vehicle navigation. These techniques use existing infrastructure (e.g., cellular technologies). These cell technologies, such as those conforming to the LTE, LTE-A, or 3GPP family of standards include beam forming to establish the navigation route. The route may be established via a particular static layout of beams to cover the region used for navigation. The information transmitted in the beam may be related to, but not limited to direction, velocity, etc. that are valid within the area covered by the beam to stay on the route. In an example, information in the beam may lead to switching from one beam to another by the vehicle for navigation purposes (e.g., taking an exit ramp, changing destination, etc.).

The network navigation function (e.g., controller) provides additional flexibility by determining, based on the vehicle's destination information, the cells that the route will pass to reach the destination. This determination, and route plan, may be communicated to any navigating device, such as a drone, a boat, a cross-country land vehicle, etc. In an example, the network navigation controller may indicate to a radio controller, such as an eNodeB, which is the next eNodeB to which the drone should travel to stay on the route.

Figure 11:
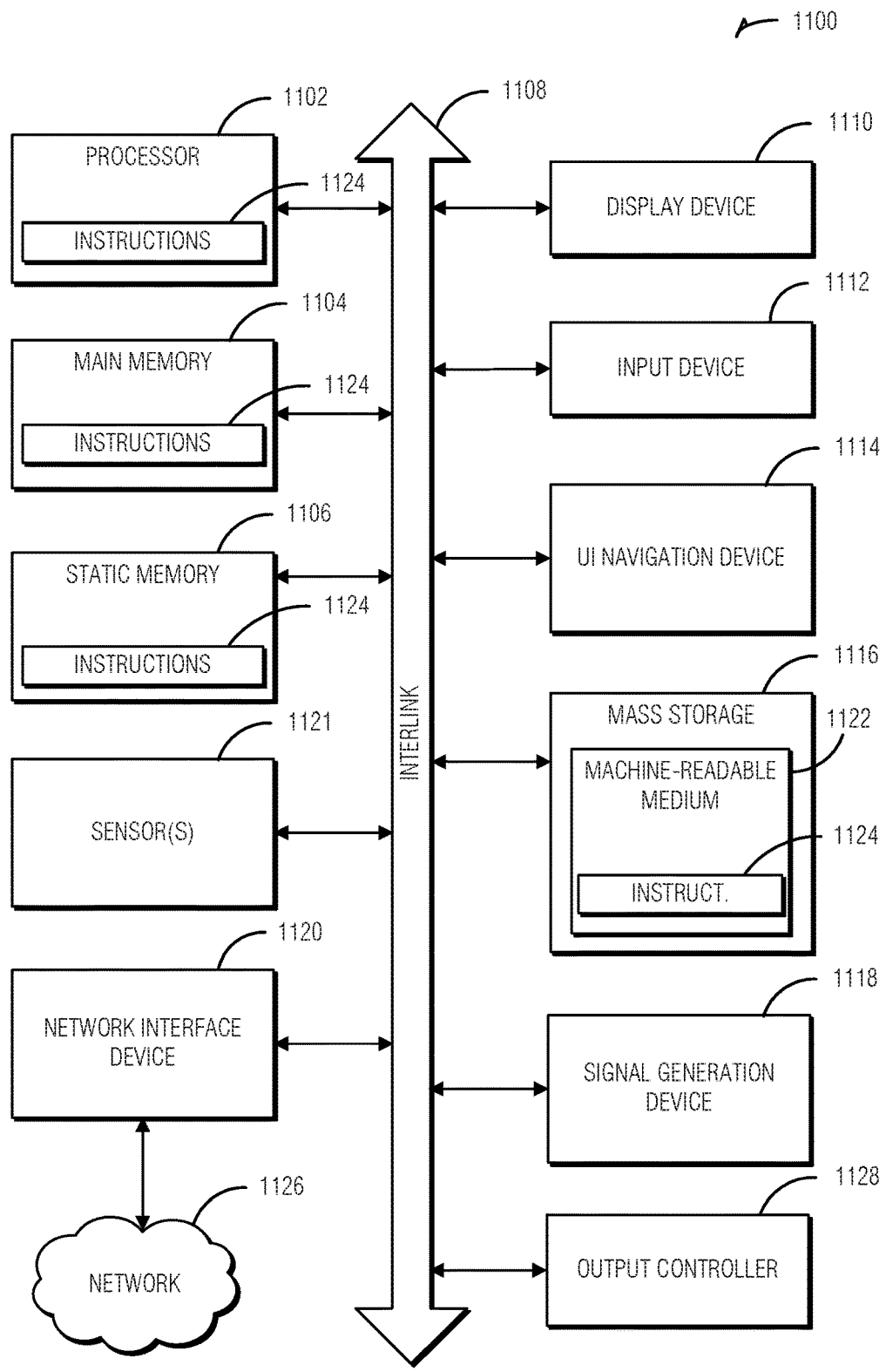
FIG. 11 is a block diagram illustrating an example of a machine upon which one or more embodiments may be implemented.

FIG. 11 illustrates a block diagram of an example machine 1100 upon which any one or more of the techniques (e.g., methodologies) discussed herein may perform. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine readable media.

While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software.

Additional Notes & Examples

Example 1 is a system for unmanned aerial vehicle navigation, the system comprising an eNodeB including: a transceiver to establish a plurality of transmission beams, each beam in the plurality of transmission beams comprising a focused photonic propagation directed to a fixed geographic area, a travel route intersecting the fixed geographic areas of the plurality of transmission beams; a decoder to receive cell entry for a vehicle transceiver entering a geographic area for a transmission beam in the plurality of beams; and an encoder to: provide scrambling codes corresponding to the plurality of transmission beams to the vehicle; and transmit a course parameter encoded with a scrambling code from the scrambling codes to the vehicle via the plurality of transmission beams.

In Example 2, the subject matter of Example 1 optionally includes wherein the scrambling codes are a single scrambling code that is the same for all beams participating in the route across all cells.

In Example 3, the subject matter of any one or more of Examples 1-2 optionally include wherein each beam in the plurality of transmission beams has a different scrambling code.

In Example 4, the subject matter of any one or more of Examples 1-3 optionally include wherein to provide the scrambling codes includes the eNodeB to perform a radio resource control (RRC) reconfiguration, the RRC reconfiguration including the scrambling codes.

In Example 5, the subject matter of Example 4 optionally includes wherein the RRC reconfiguration includes a beam geometry for beams in the plurality of transmission beams.

In Example 6, the subject matter of Example 5 optionally includes wherein the beam geometry includes at least one of a geographic anchor point, an elevation angle, or an azimuth.

In Example 7, the subject matter of any one or more of Examples 1-6 optionally include wherein the course parameter is at least one of a heading, a velocity, or an altitude.

In Example 8, the subject matter of any one or more of Examples 1-7 optionally include wherein the course parameter is transmitted via a single beam of the plurality of transmission beams.

In Example 9, the subject matter of Example 8 optionally includes wherein each beam in the plurality of transmission beams includes a corresponding fixed course parameter, a fixed course parameter being the same without regard to a position of the vehicle.

In Example 10, the subject matter of Example 9 optionally includes wherein a second vehicle is sent the same fixed course parameter that is transmitted to the vehicle.

In Example 11, the subject matter of any one or more of Examples 9-10 optionally include wherein the fixed course parameter is encoded in a navigation reference signal (NRS), the NRS being different than other NRS for other beams in the plurality of beams.

In Example 12, the subject matter of Example 11 optionally includes wherein the eNodeB is to transition the vehicle into an idle mode after providing the scrambling codes.

In Example 13, the subject matter of any one or more of Examples 8-12 optionally include a network navigation controller communicatively coupled to the eNodeB when in operation, the network navigation controller including: a second transceiver; a memory; and circuitry configured by instructions in the memory when in operation to: receive a current position for the vehicle via the second transceiver; receive a destination position for the vehicle via the second transceiver; plot the route; and direct the vehicle to the single beam via the second transceiver.

In Example 14, the subject matter of any one or more of Examples 1-13 optionally include wherein the decoder is to obtain a handover trigger based on a position of the vehicle; and wherein the encoder is to perform a handover to a second cell, the handover including a set of scrambling codes for at least one transmission beam of the second cell participating in the route.

In Example 15, the subject matter of Example 14 optionally includes wherein the set of scrambling codes is conveyed in a radio resource control (RRC) reconfiguration.

In Example 16, the subject matter of any one or more of Examples 14-15 optionally include wherein the trigger is a measurement report from the vehicle identifying the second cell and a radio condition beyond a threshold.

Example 17 is a method for unmanned aerial vehicle navigation, the method comprising: establishing a plurality of transmission beams, each beam in the plurality of transmission beams comprising a focused photonic propagation directed to a fixed geographic area, a travel route intersecting the fixed geographic areas of the plurality of transmission beams; receiving cell entry for a vehicle transceiver entering a geographic area for a transmission beam in the plurality of beams; providing scrambling codes corresponding to the plurality of transmission beams to the vehicle; and transmitting a course parameter encoded with a scrambling code from the scrambling codes to the vehicle via the plurality of transmission beams.

In Example 18, the subject matter of Example 17 optionally includes wherein the scrambling codes are a single scrambling code that is the same for all beams participating in the route across all cells.

In Example 19, the subject matter of any one or more of Examples 17-18 optionally include wherein each beam in the plurality of transmission beams has a different scrambling code.

In Example 20, the subject matter of any one or more of Examples 17-19 optionally include wherein providing the scrambling codes includes performing a radio resource control (RRC) reconfiguration, the RRC reconfiguration including the scrambling codes.

In Example 21, the subject matter of Example 20 optionally includes wherein the RRC reconfiguration includes a beam geometry for beams in the plurality of transmission beams.

In Example 22, the subject matter of Example 21 optionally includes wherein the beam geometry includes at least one of a geographic anchor point, an elevation angle, or an azimuth.

In Example 23, the subject matter of any one or more of Examples 17-22 optionally include wherein the course parameter is at least one of a heading, a velocity, or an altitude.

In Example 24, the subject matter of any one or more of Examples 17-23 optionally include wherein the course parameter is transmitted via a single beam of the plurality of transmission beams.

In Example 25, the subject matter of Example 24 optionally includes wherein each beam in the plurality of transmission beams includes a corresponding fixed course parameter, a fixed course parameter being the same without regard to a position of the vehicle.

In Example 26, the subject matter of Example 25 optionally includes wherein a second vehicle is sent the same fixed course parameter that is transmitted to the vehicle.

In Example 27, the subject matter of any one or more of Examples 25-26 optionally include wherein the fixed course parameter is encoded in a navigation reference signal (NRS), the NRS being different than other NRS for other beams in the plurality of beams.

In Example 28, the subject matter of Example 27 optionally includes transitioning the vehicle into an idle mode after providing the scrambling codes.

In Example 29, the subject matter of any one or more of Examples 24-28 optionally include receiving a current position for the vehicle; receiving a destination position for the vehicle; plotting the route; and directing the vehicle to the single beam.

In Example 30, the subject matter of any one or more of Examples 17-29 optionally include obtaining a handover trigger based on a position of the vehicle; and performing a handover to a second cell, the handover including a set of scrambling codes for at least one transmission beam of the second cell participating in the route.

In Example 31, the subject matter of Example 30 optionally includes wherein the set of scrambling codes is conveyed in a radio resource control (RRC) reconfiguration.

In Example 32, the subject matter of any one or more of Examples 30-31 optionally include wherein the trigger is a measurement report from the vehicle identifying the second cell and a radio condition beyond a threshold.

Example 33 is at least one machine readable medium including instructions that, when executed by a machine, cause the machine to perform any method of Examples 17-32.

Example 34 is a system comprising means to perform any method of Examples 17-32.

Example 35 is a system for unmanned aerial vehicle navigation, the system comprising: means for establishing a plurality of transmission beams, each beam in the plurality of transmission beams comprising a focused photonic propagation directed to a fixed geographic area, a travel route intersecting the fixed geographic areas of the plurality of transmission beams; means for receiving cell entry for a vehicle transceiver entering a geographic area for a transmission beam in the plurality of beams; means for providing scrambling codes corresponding to the plurality of transmission beams to the vehicle; and means for transmitting a course parameter encoded with a scrambling code from the scrambling codes to the vehicle via the plurality of transmission beams.

In Example 36, the subject matter of Example 35 optionally includes wherein the scrambling codes are a single scrambling code that is the same for all beams participating in the route across all cells.

In Example 37, the subject matter of any one or more of Examples 35-36 optionally include wherein each beam in the plurality of transmission beams has a different scrambling code.

In Example 38, the subject matter of any one or more of Examples 35-37 optionally include wherein the means for providing the scrambling codes includes means for performing a radio resource control (RRC) reconfiguration, the RRC reconfiguration including the scrambling codes.

In Example 39, the subject matter of Example 38 optionally includes wherein the RRC reconfiguration includes a beam geometry for beams in the plurality of transmission beams.

In Example 40, the subject matter of Example 39 optionally includes wherein the beam geometry includes at least one of a geographic anchor point, an elevation angle, or an azimuth.

In Example 41, the subject matter of any one or more of Examples 35-40 optionally include wherein the course parameter is at least one of a heading, a velocity, or an altitude.

In Example 42, the subject matter of any one or more of Examples 35-41 optionally include wherein the course parameter is transmitted via a single beam of the plurality of transmission beams.

In Example 43, the subject matter of Example 42 optionally includes wherein each beam in the plurality of transmission beams includes a corresponding fixed course parameter, a fixed course parameter being the same without regard to a position of the vehicle.

In Example 44, the subject matter of Example 43 optionally includes wherein a second vehicle is sent the same fixed course parameter that is transmitted to the vehicle.

In Example 45, the subject matter of any one or more of Examples 43-44 optionally include wherein the fixed course parameter is encoded in a navigation reference signal (NRS), the NRS being different than other NRS for other beams in the plurality of beams.

In Example 46, the subject matter of Example 45 optionally includes means for transitioning the vehicle into an idle mode after providing the scrambling codes.

In Example 47, the subject matter of any one or more of Examples 42-46 optionally include means for receiving a current position for the vehicle; means for receiving a destination position for the vehicle; means for plotting the route; and means for directing the vehicle to the single beam.

In Example 48, the subject matter of any one or more of Examples 35-47 optionally include means for obtaining a handover trigger based on a position of the vehicle; and means for performing a handover to a second cell, the handover including a set of scrambling codes for at least one transmission beam of the second cell participating in the route.

In Example 49, the subject matter of Example 48 optionally includes wherein the set of scrambling codes is conveyed in a radio resource control (RRC) reconfiguration.

In Example 50, the subject matter of any one or more of Examples 48-49 optionally include wherein the trigger is a measurement report from the vehicle identifying the second cell and a radio condition beyond a threshold.

Example 51 is at least one machine readable medium including instructions for unmanned aerial vehicle navigation, the instructions, when executed by a machine, cause the machine to: establish a plurality of transmission beams, each beam in the plurality of transmission beams comprising a focused photonic propagation directed to a fixed geographic area, a travel route intersecting the fixed geographic areas of the plurality of transmission beams; receive cell entry for a vehicle transceiver entering a geographic area for a transmission beam in the plurality of beams; provide scrambling codes corresponding to the plurality of transmission beams to the vehicle; and transmit a course parameter encoded with a scrambling code from the scrambling codes to the vehicle via the plurality of transmission beams.

In Example 52, the subject matter of Example 51 optionally includes wherein the scrambling codes are a single scrambling code that is the same for all beams participating in the route across all cells.

In Example 53, the subject matter of any one or more of Examples 51-52 optionally include wherein each beam in the plurality of transmission beams has a different scrambling code.

In Example 54, the subject matter of any one or more of Examples 51-53 optionally include wherein to provide the scrambling codes includes performing a radio resource control (RRC) reconfiguration, the RRC reconfiguration including the scrambling codes.

In Example 55, the subject matter of Example 54 optionally includes wherein the RRC reconfiguration includes a beam geometry for beams in the plurality of transmission beams.

In Example 56, the subject matter of Example 55 optionally includes wherein the beam geometry includes at least one of a geographic anchor point, an elevation angle, or an azimuth.

In Example 57, the subject matter of any one or more of Examples 51-56 optionally include wherein the course parameter is at least one of a heading, a velocity, or an altitude.

In Example 58, the subject matter of any one or more of Examples 51-57 optionally include wherein the course parameter is transmitted via a single beam of the plurality of transmission beams.

In Example 59, the subject matter of Example 58 optionally includes wherein each beam in the plurality of transmission beams includes a corresponding fixed course parameter, a fixed course parameter being the same without regard to a position of the vehicle.

In Example 60, the subject matter of Example 59 optionally includes wherein a second vehicle is sent the same fixed course parameter that is transmitted to the vehicle.

In Example 61, the subject matter of any one or more of Examples 59-60 optionally include wherein the fixed course parameter is encoded in a navigation reference signal (NRS), the NRS being different than other NRS for other beams in the plurality of beams.

In Example 62, the subject matter of Example 61 optionally includes wherein the instructions cause the machine to transition the vehicle into an idle mode after providing the scrambling codes.

In Example 63, the subject matter of any one or more of Examples 58-62 optionally include wherein the instructions cause the machine to: receive a current position for the vehicle; receive a destination position for the vehicle; plot the route; and direct the vehicle to the single beam.

In Example 64, the subject matter of any one or more of Examples 51-63 optionally include wherein the instructions cause the machine to: obtain a handover trigger based on a position of the vehicle; and perform a handover to a second cell, the handover including a set of scrambling codes for at least one transmission beam of the second cell participating in the route.

In Example 65, the subject matter of Example 64 optionally includes wherein the set of scrambling codes is conveyed in a radio resource control (RRC) reconfiguration.

In Example 66, the subject matter of any one or more of Examples 64-65 optionally include wherein the trigger is a measurement report from the vehicle identifying the second cell and a radio condition beyond a threshold.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for unmanned aerial vehicle navigation, the system comprising an eNodeB including:
    a transceiver to establish a plurality of transmission beams, each beam in the plurality of transmission beams comprising a focused photonic propagation directed to a fixed geographic area, a travel route intersecting the fixed geographic areas of the plurality of transmission beams;
    a decoder to receive cell entry for a vehicle transceiver entering a geographic area for a transmission beam in the plurality of beams; and
    an encoder to:
        provide scrambling codes corresponding to the plurality of transmission beams to the vehicle; and
        transmit a course parameter to the vehicle via the plurality of transmission beams, wherein the course parameter is at least one of a heading, a velocity, or an altitude that, when followed a vehicle with the vehicle transceiver, define a virtual highway for the travel route without foreknowledge by the vehicle.

2. The system of claim 1, wherein the scrambling codes are a single scrambling code that is the same for all beams participating in the travel route across all cells.

3. The system of claim 1, wherein a second plurality of beams established by the transceiver define a second virtual highway for a second travel route.

4. The system of claim 3, wherein the second plurality of beams have second scrambling codes corresponding to the second virtual highway.

5. The system of claim 1, wherein each beam in the plurality of transmission beams includes a corresponding fixed course parameter, a fixed course parameter being the same without regard to a position of the vehicle.

6. The system of claim 5, wherein a second vehicle is sent the same fixed course parameter that is transmitted to the vehicle.

7. The system of claim 5, wherein the fixed course parameter is encoded in a navigation reference signal (NRS), the NRS being different than other NRS for other beams in the plurality of beams.

8. The system of claim 7, wherein the eNodeB is to transition the vehicle into an idle mode after providing the scrambling codes.

9. A method for unmanned aerial vehicle navigation, the method comprising:
    establishing a plurality of transmission beams, each beam in the plurality of transmission beams comprising a focused photonic propagation directed to a fixed geographic area, a travel route intersecting the fixed geographic areas of the plurality of transmission beams;
    receiving cell entry for a vehicle transceiver entering a geographic area for a transmission beam in the plurality of beams;
    providing scrambling codes corresponding to the plurality of transmission beams to the vehicle; and
    transmitting a course parameter to the vehicle via the plurality of transmission beams, wherein the course parameter is at least one of a heading, a velocity, or an altitude that, when followed a vehicle with the vehicle transceiver, define a virtual highway for the travel route without foreknowledge by the vehicle.

10. The method of claim 9, wherein the scrambling codes are a single scrambling code that is the same for all beams participating in the travel route across all cells.

11. The method of claim 9, wherein a second plurality of beams established by the transceiver define a second virtual highway for a second travel route.

12. The method of claim 9, wherein the second plurality of beams have second scrambling codes corresponding to the second virtual highway.

13. The method of claim 9, wherein each beam in the plurality of transmission beams includes a corresponding fixed course parameter, a fixed course parameter being the same without regard to a position of the vehicle.

14. The method of claim 13, wherein a second vehicle is sent the same fixed course parameter that is transmitted to the vehicle.

15. The method of claim 13, wherein the fixed course parameter is encoded in a navigation reference signal (NRS), the NRS being different than other NRS for other beams in the plurality of beams.

16. The method of claim 15, comprising transitioning the vehicle into an idle mode after providing the scrambling codes.

17. At least one non-transitory machine readable medium including instructions for unmanned aerial vehicle navigation, the instructions, when executed by a machine, cause the machine to:
    establish a plurality of transmission beams, each beam in the plurality of transmission beams comprising a focused photonic propagation directed to a fixed geographic area, a travel route intersecting the fixed geographic areas of the plurality of transmission beams;
    receive cell entry for a vehicle transceiver entering a geographic area for a transmission beam in the plurality of beams;
    provide scrambling codes corresponding to the plurality of transmission beams to the vehicle; and
    transmitting a course parameter to the vehicle via the plurality of transmission beams, wherein the course parameter is at least one of a heading, a velocity, or an altitude that, when followed a vehicle with the vehicle transceiver, define a virtual highway for the travel route without foreknowledge by the vehicle.

18. The at least one machine readable medium of claim 17, wherein the scrambling codes are a single scrambling code that is the same for all beams participating in the travel route across all cells.

19. The at least one machine readable medium of claim 17, wherein a second plurality of beams established by the transceiver define a second virtual highway for a second travel route.

20. The at least one machine readable medium of claim 17, wherein second plurality of beams have second scrambling codes corresponding to the second virtual highway.

21. The at least one machine readable medium of claim 17, wherein each beam in the plurality of transmission beams includes a corresponding fixed course parameter, a fixed course parameter being the same without regard to a position of the vehicle.

22. The at least one machine readable medium of claim 21, wherein a second vehicle is sent the same fixed course parameter that is transmitted to the vehicle.

23. The at least one machine readable medium of claim 21, wherein the fixed course parameter is encoded in a navigation reference signal (NRS), the NRS being different than other NRS for other beams in the plurality of beams.

24. The at least one machine readable medium of claim 23, wherein the instructions cause the machine to transition the vehicle into an idle mode after providing the scrambling codes.

* * * * *

UNITED STATES PATENT AND TRADEMARK OFFICE
CERTIFICATE OF CORRECTION

PATENT NO. : 10,049,587 B2
APPLICATION NO. : 15/200154
DATED : August 14, 2018
INVENTOR(S) : Kalathil et al.

Page 1 of 1

It is certified that error appears in the above-identified patent and that said Letters Patent is hereby corrected as shown below:

In the Claims

In Column 19, Line 10, in Claim 20, after "wherein", insert --the--

Signed and Sealed this
Eighteenth Day of June, 2019

Andrei Iancu
*Director of the United States Patent and Trademark Office*